United States Patent [19]
Nashiki et al.

[11] Patent Number: 5,097,161
[45] Date of Patent: Mar. 17, 1992

[54] LINEAR ACTUATOR

[75] Inventors: Masayuki Nashiki; Seiichi Iwasaka, both of Aichi, Japan

[73] Assignee: Kabushiki Kaisha Okuma Tekkosho, Aichi, Japan

[21] Appl. No.: 429,367

[22] Filed: Oct. 31, 1989

[30] Foreign Application Priority Data

Oct. 31, 1988 [JP] Japan .................. 63-275151

[51] Int. Cl.$^5$ .................. H02K 41/00; H02N 2/00
[52] U.S. Cl. .................. 310/12; 310/26
[58] Field of Search .................. 310/12, 26

[56] References Cited
FOREIGN PATENT DOCUMENTS
0305766 12/1988 Japan .................. 310/12

Primary Examiner—Steven L. Stephan
Assistant Examiner—Judson H. Jones
Attorney, Agent, or Firm—Wenderoth, Lind & Ponack

[57] ABSTRACT

A linear attuator of the present invention performs the fixing of a driving base by the primary fine means when the deflection of the moving velocity of the driving base in a driven direction and the moving velocity of the primary fine means driven by the secondary fine means in the driven direction becomes less than or equal to a specified allowable value, i.e., when the relating velocity becomes nearly zero, and moves the primary fine means driven by the secondary fine means in the direction opposite to that of the driven direction after not transferring the driving force of the secondary fine means to the driving base when the driving base is separated from the primary fine means. Thus, the driving base can be driven by a stroke longer than the driving stroke of the fine actuator itself at a specific velocity and it can be driven smoothly.

8 Claims, 12 Drawing Sheets

PRIOR ART

FIG. 1

PRIOR ART

LINEAR ACTUATOR

BACKGROUND OF THE INVENTION

The present invention relates to a linear actuator which can precise carry out velocity and positioning control.

Until now, there have been means for utilizing a motor or a linear motor, or means for utilizing fine actuators, such as piezoelectric elements, to accomplish precise linear drive.

Figure 1:
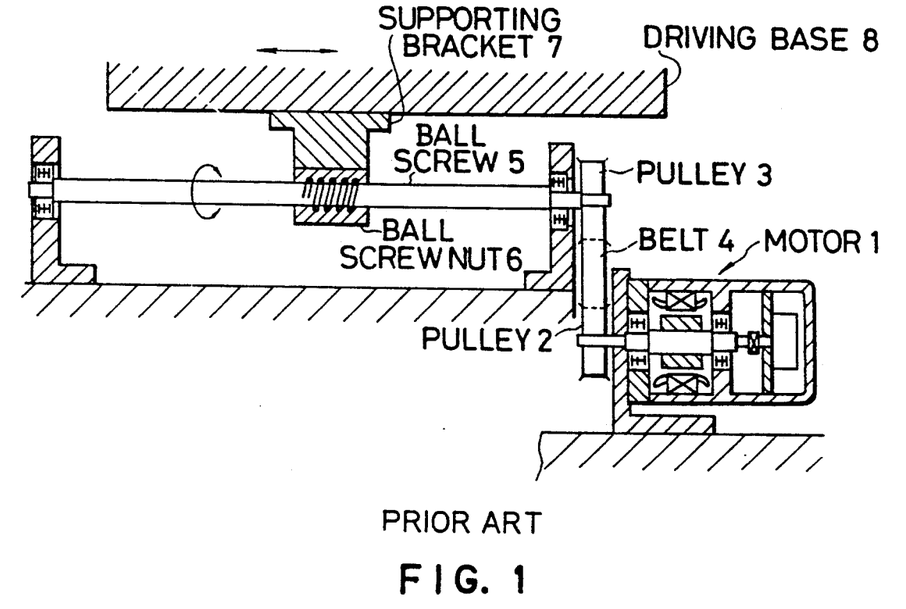
FIGS. 1 to 3 are diagrammatic perspective cross-sectional views of examples of a conventional means for achieving a linear driving force.

FIG. 1 is a summarized cross-sectional view of one example of a means for indirectly obtaining a linear driving force utilizing a motor. A rotational driving force obtained by a motor 1 is transferred to a ball screw 5 through pulleys 2 and 3 and a belt 4, converted into the linear driving force by a ball screw nut 6 into which the ball screw 5 is screwed, and linearly drives a driving base 8 through a supporting bracket 7.

Figure 2:
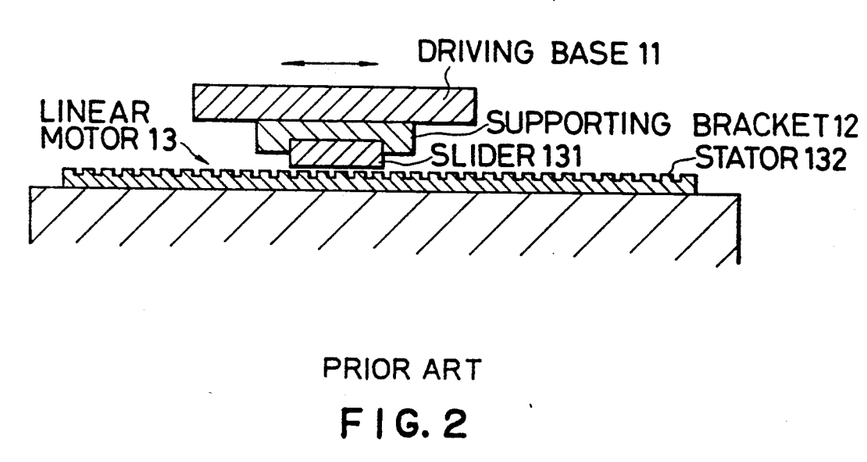

FIG. 2 is a summarized cross-sectional view of one example of a means for directly obtaining a linear driving force utilizing a linear motor. A slider 131 of a linear motor 13 is fixed to a driving base 11 through a supporting bracket 12 and the driving base 11 is linearly driven by the linear driving force of the linear motor 13.

Figure 3:
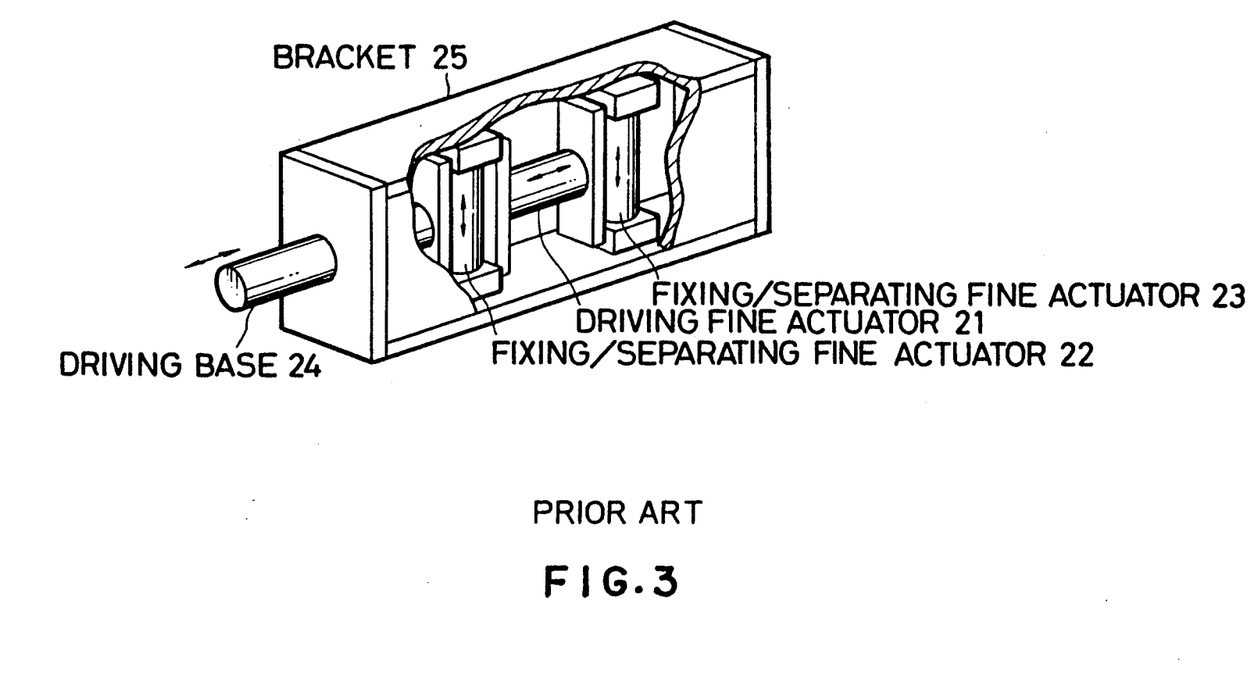

FIG. 3 is a summarized cross-sectional view of one example of a means for directly obtaining a linear driving force utilizing fine actuators such as piezoelectric elements. Both ends of a cylindrical driving fine actuator 21 which can axially expand and contract are respectively fastened to side faces of fixing/separating fine actuators 22 and 23 like the fine actuator 21, and a rod-like driving base 24 is fastened to the side face of the fixing/separating fine actuator 22 so that its longitudinal axis is coincident with the direction of expansion and contraction of the driving fine actuator 21. In the actuator unit of such a structure, the driving base 24 runs through the side of a box-like supporting bracket 25, and the fixing/separating fine actuators 22 and 23 are housed in the supporting bracket 25 so that they support the inside face of the supporting bracket 25 in an expansion state and come apart from the inside face of the supporting bracket 25 in a contraction state.

Figure 4:
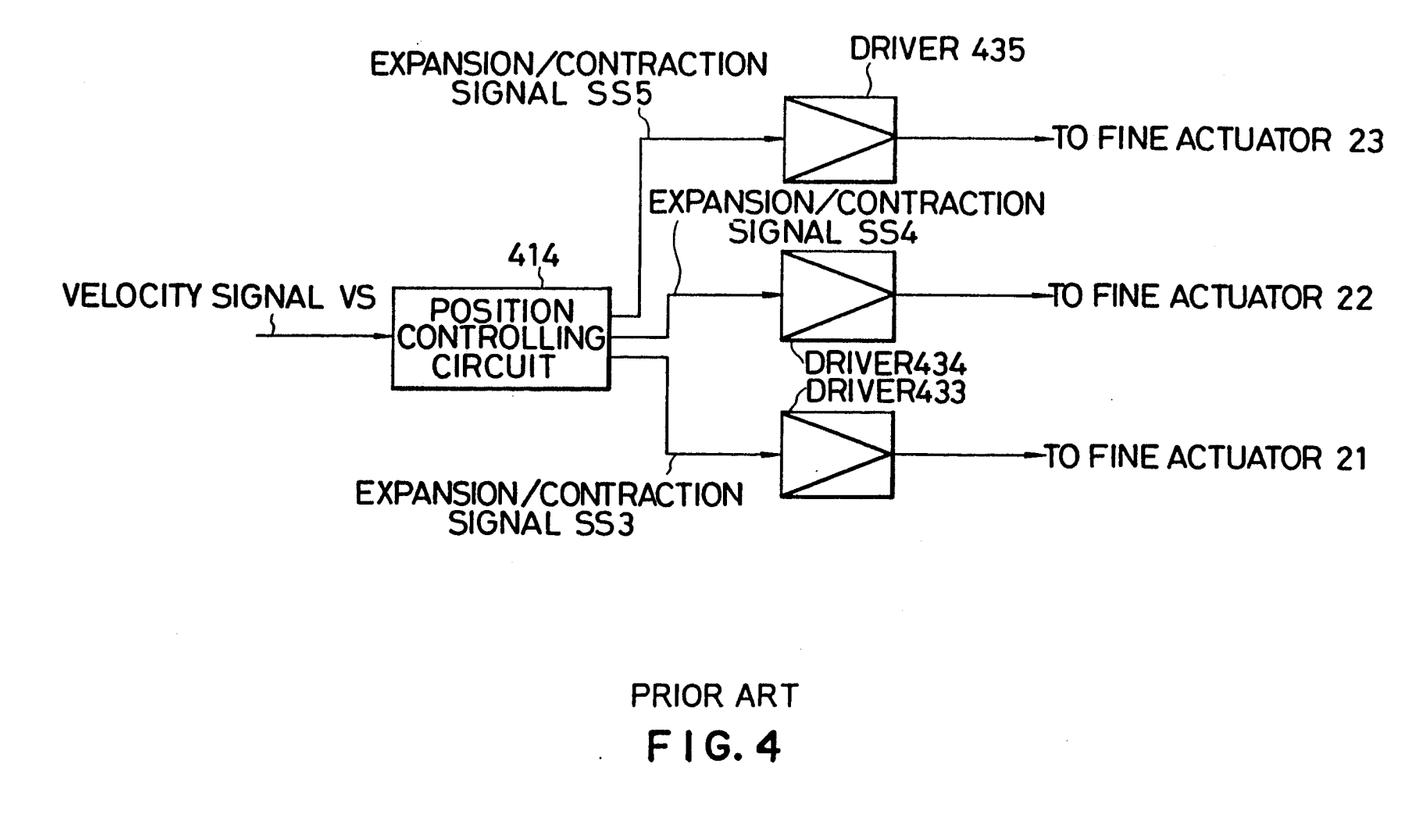
FIG. 4 is a block diagram of the driving apparatus shown in FIG. 3.

FIG. 4 is a block diagram of one example of a driving apparatus of the linear driving means shown in FIG. 3. A position controlling circuit 414 inputs a velocity signal VS and outputs expansion/contraction signals SS3, SS4 and SS5 to each of drives 433, 434 and 435. Each driver 433, 434 and 435 supplies each of the expansion/contraction signals SS3, SS4 and SS5 to the respective fine actuators 21, 22 and 23 after power amplifications. An example of each of the expansion/contraction signals and each of the driver's outputs is shown in the time chart in FIG. 5, and the velocity signal is in proportion to frequency of each of the expansion/contraction signals. Its operating sequence will be explained referring to the time chart shown in FIG. 5 as follows.

Figure 5:
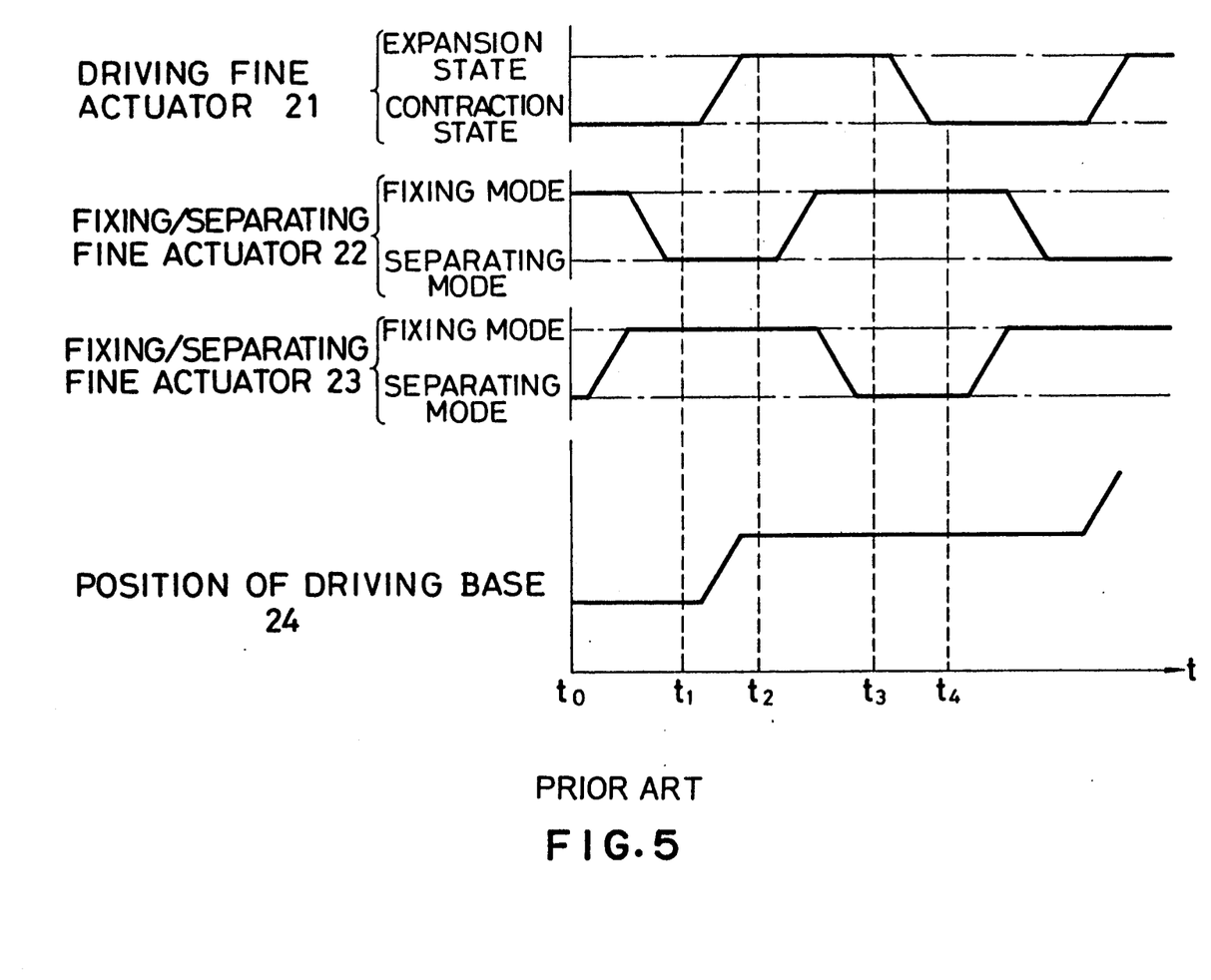
FIG. 5 is a time chart of the operating example of the means shown in FIG. 3.

(1) Time $t_0$–Time $t_1$

The driving fine actuator 21 stops in the contraction state and the fixing/separating fine actuator 23 operates from the contraction state to the expansion state, i.e., from the condition that the fine actuator 23 separates from the inside face of the supporting bracket 25 (separating mode) to the condition that it supports the inside face of the supporting bracket 25 (fixing mode), and then the operation of the fixing/separating fine actuator 22 operates from the fixing mode to the separating mode. Therefore, the driving base 24 remains stopped.

(2) Time $t_1$–Time $t_2$

The driving fine actuator 21 operates from the contraction state to the expansion state under the conditions that the fixing/separating fine actuator 23 is in the fixing mode and the fixing/separating fine actuator 22 is in the separating mode. The fixing/separating fine actuator 22 and the driving base 24 fastened by this actuator 22 are driven by these conditions.

(3) Time $t_2$–Time $t_3$

The driving fine actuator 21 stops during the expansion state, and the fixing/separating fine actuator 22 operates from the separating mode to the fixing mode, and then the fixing/separating fine actuator 23 operates from the fixing mode to the separating mode. Therefore, the driving base 24 remains stopped.

(4) Time $t_3$–Time $t_4$

The driving fine actuator 21 operates from the expansion state to the contraction state under the conditions that the fixing/separating fine actuator 22 is in the fixing mode, and the fixing/separating fine actuator 23 is in the separating mode. The fixing/separating fine actuator 23 is driven, and the driving base 24 remians stopped by these conditions.

The above described sequence is one cycle of the operation of the linear driving means utilizing the conventional fine actuators.

In the above described linear driving means utilizing the motor, a mechanical converting mechanism, such as the ball screw, is always required to supply the linear driving force to the driving base 8. Therefore, there are problems in that precise movement cannot be attained because of mechanical strain or looseness of the converting mechanism, and the poorness of the transmission efficiency induced by the mechanical loss of the converting mechanisms. In addition, since the motor utilizes an electromagnetic force, a limitation naturally exists in the compactness because of the balanced largeness (the diameter and the length) of the motor is required in order to generate the appropriate torque.

In the above described linear driving means utilizing the linear motor, although the mechanical converting mechanism shown in FIG. 2 is not required and it becomes a compact mechanism, a length of a stator 132 opposite to a slider 131 of the linear motor 13 is required the length of one stroke to obtain the driving force at the whole stroke and it required to be large because of its driving principle and it is therefore expensive.

In the above described linear driving means utilizing the fine actuator, although it becomes a compact and simple mechanism, smooth movement cannot be obtained because of the intermittence of the movement of the driving base 24 repeatedly starting and stopping.

SUMMARY OF THE INVENTION

The present invention seeks to solve the above problems and the purpose of this invention is to provide a compact linear actuator with a high propulsion force which operates smoothly at high speed, and can be driven with a high accuracy and high acceleration and deceleration.

According to an aspect of this invention, for achieving the object described above, there is provided a linear actuator comprising: a primary fine means capable of fixing and separating a driving base, secondary fine means capable of fine driving said primary means and controlling means controlling the movements of said primary fine means and secondary fine means, whereby the fixing of said driving base by said primary fine means is performed when the deflection of the moving velocity of said driving base in a driven direction and the moving velocity of said primary fine means driven by said secondary fine means in said driven direction becomes less than or equal to a specified allowable value, and the driving of said primary fine means driven by said secondary fine means in the direction opposite to that of said driven direction after not transferring the driving force of said secondary fine means to said driving base is controlled when said driving base is separated from said primary fine means.

The nature, principle and utility of the invention will become more apparent from the following detailed description when read in conjunction with the accompanying drawings.

DESCRIPTION OF THE PREFERRED EMBODIMENTS

Figure 6:
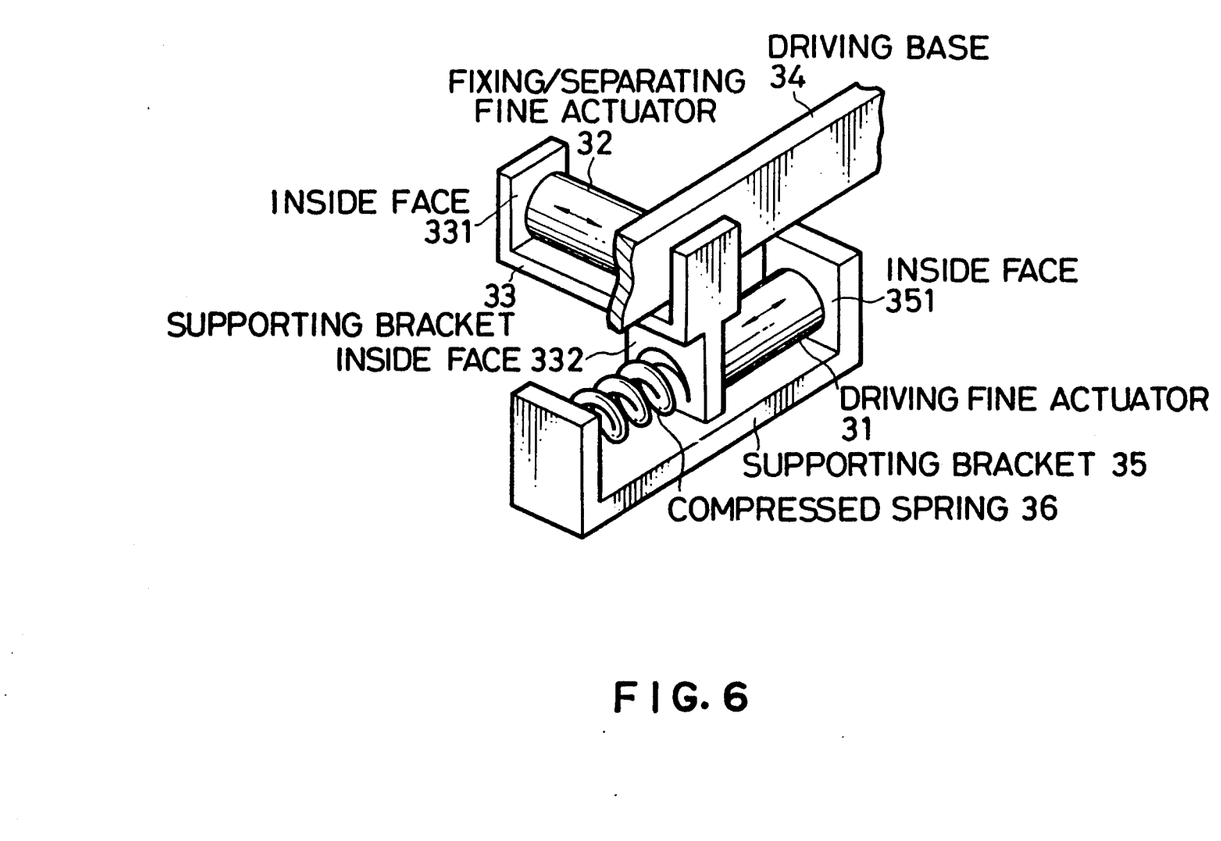
FIG. 6 is a perspective view of one example of a linear actuator of this invention.

FIG. 6 is a summarized perspective view of one embodiment of a linear actuator of the present invention. One end of a cylindrical fixing/separating fine actuator 32 which expands and contracts in the axial direction is fastened to one inside face 331 of a ]-shaped supporting bracket 33, and a rod-shaped driving base 34 is inserted between the other end of the fixing/separating fine actuator 32 and the other inside face of the supporting bracket 33. In addition, one end of, the driving fine actuator 31 similar to the fixing/separating fine actuator 32 is fastened to one inside face 351 of another ]-shaped supporting bracket 35, and one end of a compressed spring 36 is fastened to the another inside face of the supporting bracket 35. Still more a foot 332 of the supporting bracket 33 is pinched and fastened between the other end of the driving fine actuator 31 and the other end of the compressed spring 36 so that the expanding direction of the fixing/separating fine actuator 32 and that of the driving fine actuator 31 are orthogonal.

Figure 7:
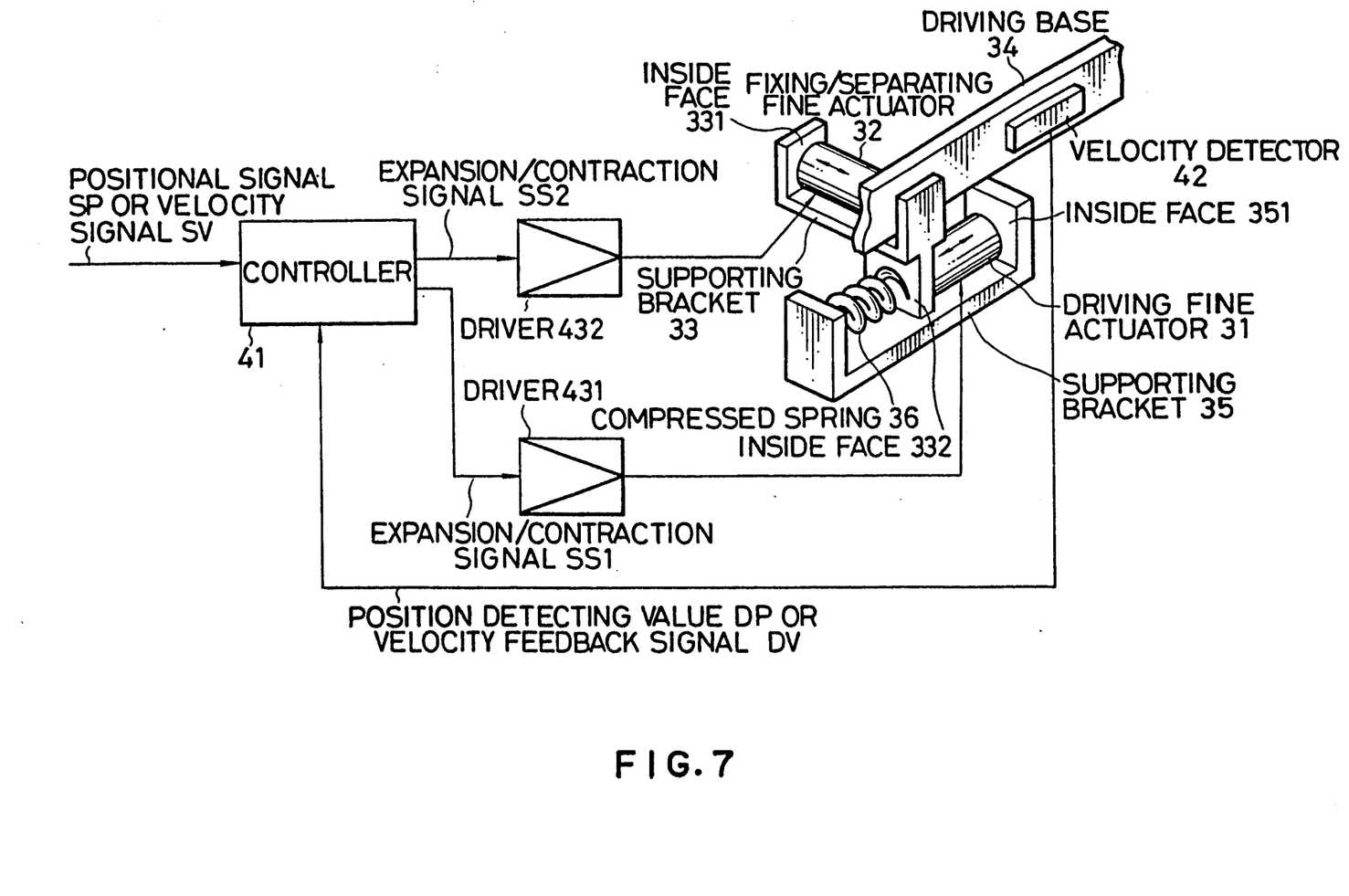
FIG. 7 is a block diagram of one example of an apparatus for controlling the linear actuator.

FIG. 7 is a block diagram of one example of the apparatus controlling the above described linear actuator. A controller 41 compares a positional signal SP or a velocity signal SV with a position detecting value DP or a velocity feedback signal DV sent from a position detector or a velocity detector 42 mounted on the driving base 34 and outputs expansion/contraction signals SS1 and SS2 to drivers 431 and 432 depending on the relative relationship between the driving fine actuator 31 and the fixing/separating fine actuator 32. Each of the drivers 431 and 432 controls the driving fine actuator 31 and the fixing/separating fine actuator 32 after amplification of the expansion/contraction signals SS1 and SS2, and thereby drive the driving base 34.

Figure 8:
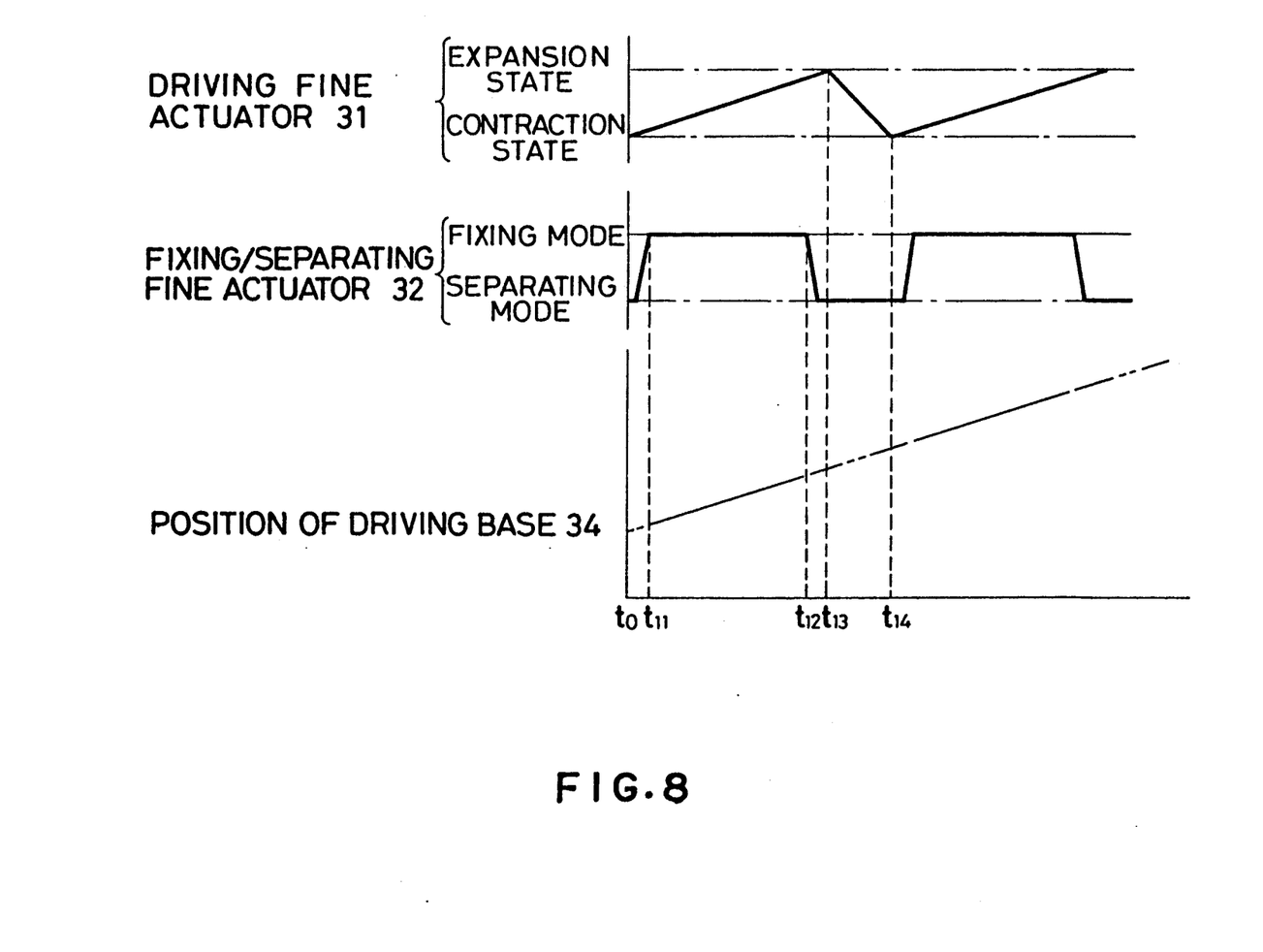
FIG. 8 is a time chart of the operating example of the linear actuator.

The operational sequence of this linear actuator is brought about as a time chart shown in FIG. 8, and is explained as follows.

(1) Time $t_0$–Time $t_{11}$

Figure 9A:
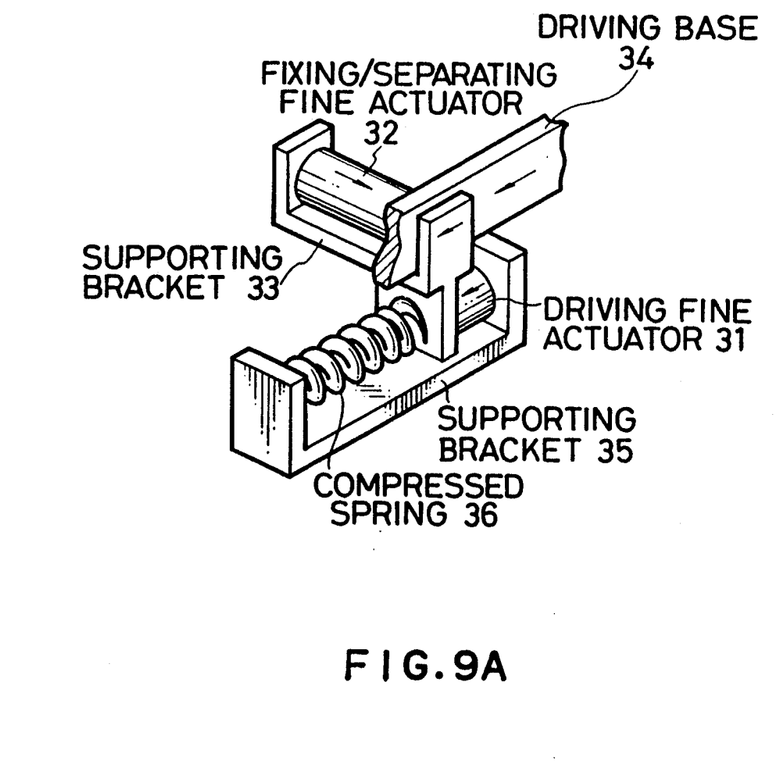
FIGS. 9A-9D are perspective views of the operation of the linear actuator.

The driving fine actuator 31 operates from the contraction state to an expansion state, and the fixing/separating fine actuator 32 operates from a condition that the actuator 32 is separated from the driving base 34 (separating mode) to a condition that it supports the driving base 34 (fixing mode) at the time that the deflection of the moving velocity of the driving base 34 by the inertial force (later explained in detail) and the moving velocity of the driving fine actuator 31, i.e., the moving velocity of the supporting bracket 33, becomes less than or equal to the specified allowable value. The fixing/separating fine actuator 32 is in the fixing mode (FIG. 9A).

(2) Time $t_{11}$–Time $t_{12}$

Figure 9B:
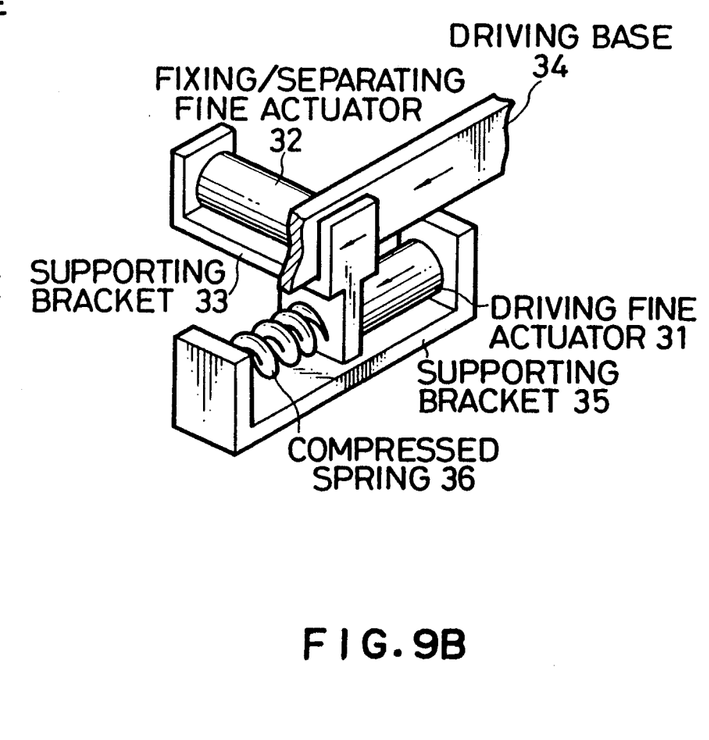

Since the driving base 34 and the supporting bracket 33 are fixed by the fixing/separating fine actuator 32, the driving base 34 is precisely controlled and driven by the expanding operation of the driving fine actuator 31 (FIG. 9B).

(3) Time $t_{12}$–Time $t_{13}$

Figure 9C:
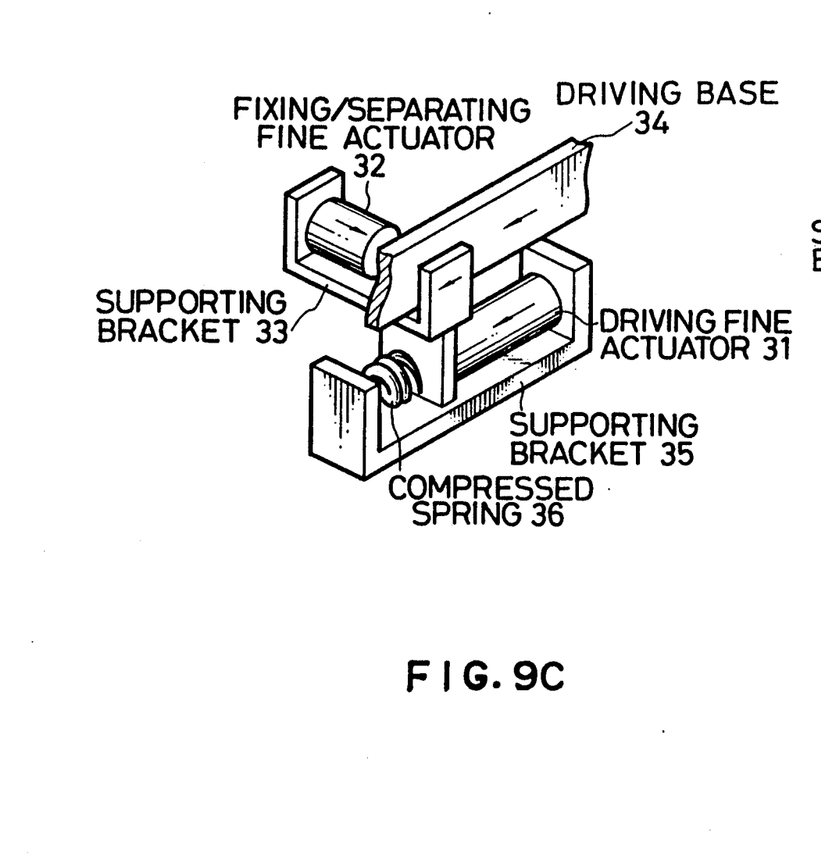

The driving base 34 is separated from the supporting bracket 33 since the fixing/separating fine actuator 32 operates from the fixing mode to the separating mode. Therefore, although the driving force of the driving fine actuator 31 is not transferred to the driving base 34, the driving base 34 continues driving by the force of inertia (FIG. 9C).

(4) Time $t_{13}$–Time $t_{14}$

Figure 9D:
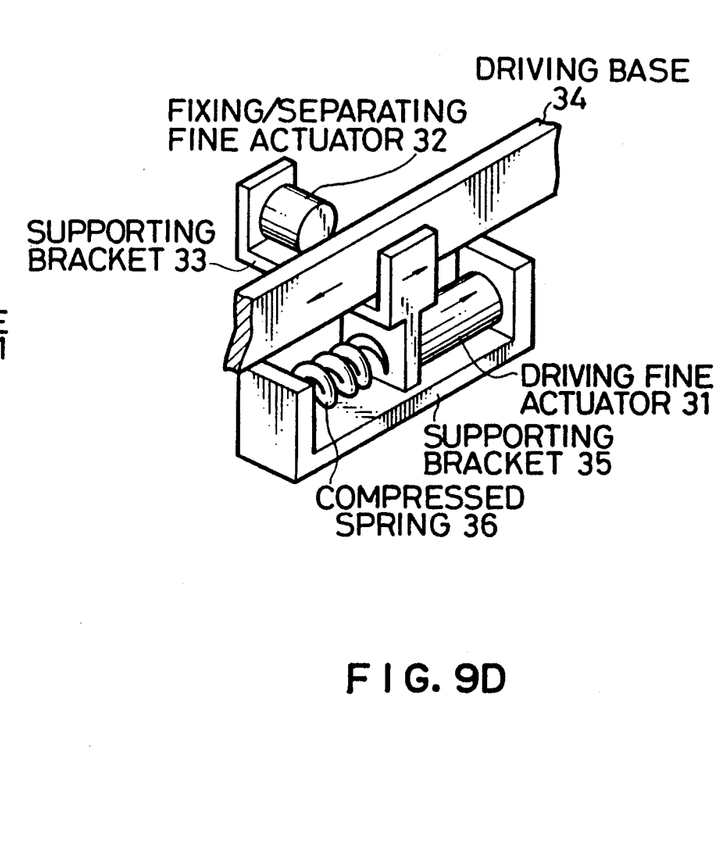

Since the fixing/separating fine actuator 32 is in the separating mode, the driving base 34 continues driving by the force of inertia. Still more the fixing/separating fine actuator 32 and the supporting bracket 33 move to the direction opposite to the moving direction of the driving base 34 preparing for the next operating cycle by the operation of the driving fine actuator 31 from the expansion state to the contraction state (FIG. 9D).

The above described sequence is one cycle of the operation of one example of the linear actuator of the present invention. The driving base 34 can be thus moved an specific distance at an specific velocity without stopping by the continuous repetition of (1) to (4) steps.

Figure 10:
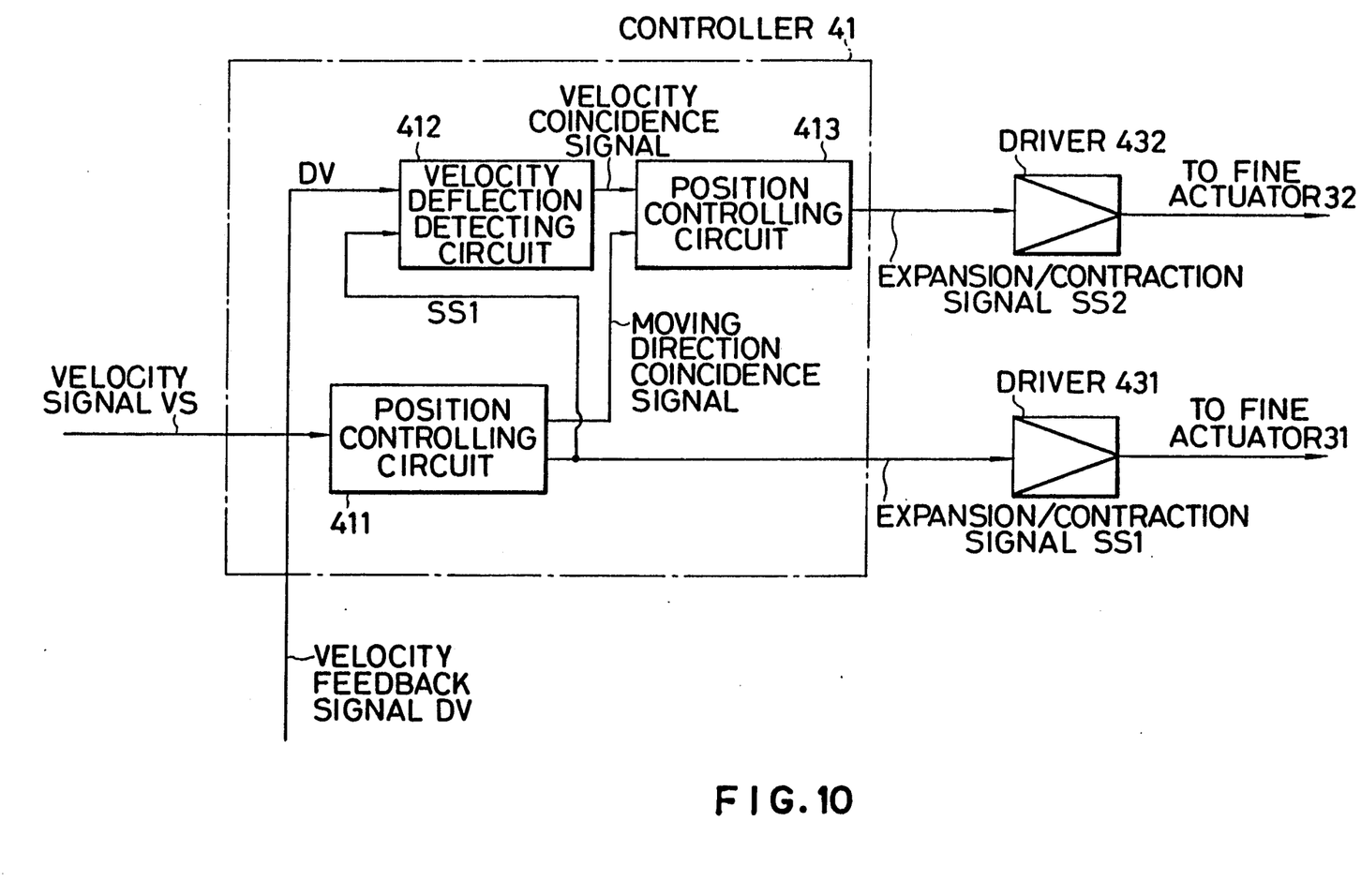
FIG. 10 is a block diagram of one example of the controller of this invention.

FIG. 10 is a block diagram of one example of controller 41.

A position controlling circuit 411 inputs a velocity signal VS and outputs the expansion/contraction signal SS1, which is the position signal of the fine actuator 31, and the moving direction coincidence signal, which is the driving signal of the driving base.

A velocity deflection detecting circuit 412 inputs a velocity feedback signal DV and the aforementioned expansion/contraction signal SS1, calculating the velocity deflection of the variation of the expansion/contraction signal SS1, i.e., the velocity signal and the velocity feedback signal DV, and outputs the velocity coincidence signal when the value of velocity deflection becomes less than or equal to an allowable value.

A position controlling circuit 413 outputs the expansion/contraction signal SS2 to the fixing/separating fine actuator 32 depending on the logical multiply of the velocity coincidence signal and the moving direction coincidence signal.

Each of the expansion/contraction signals SS1 and SS2 is amplified power by drivers 431 and 432 respectively and then supplied to each fine actuator 31 and 32.

Figure 11:
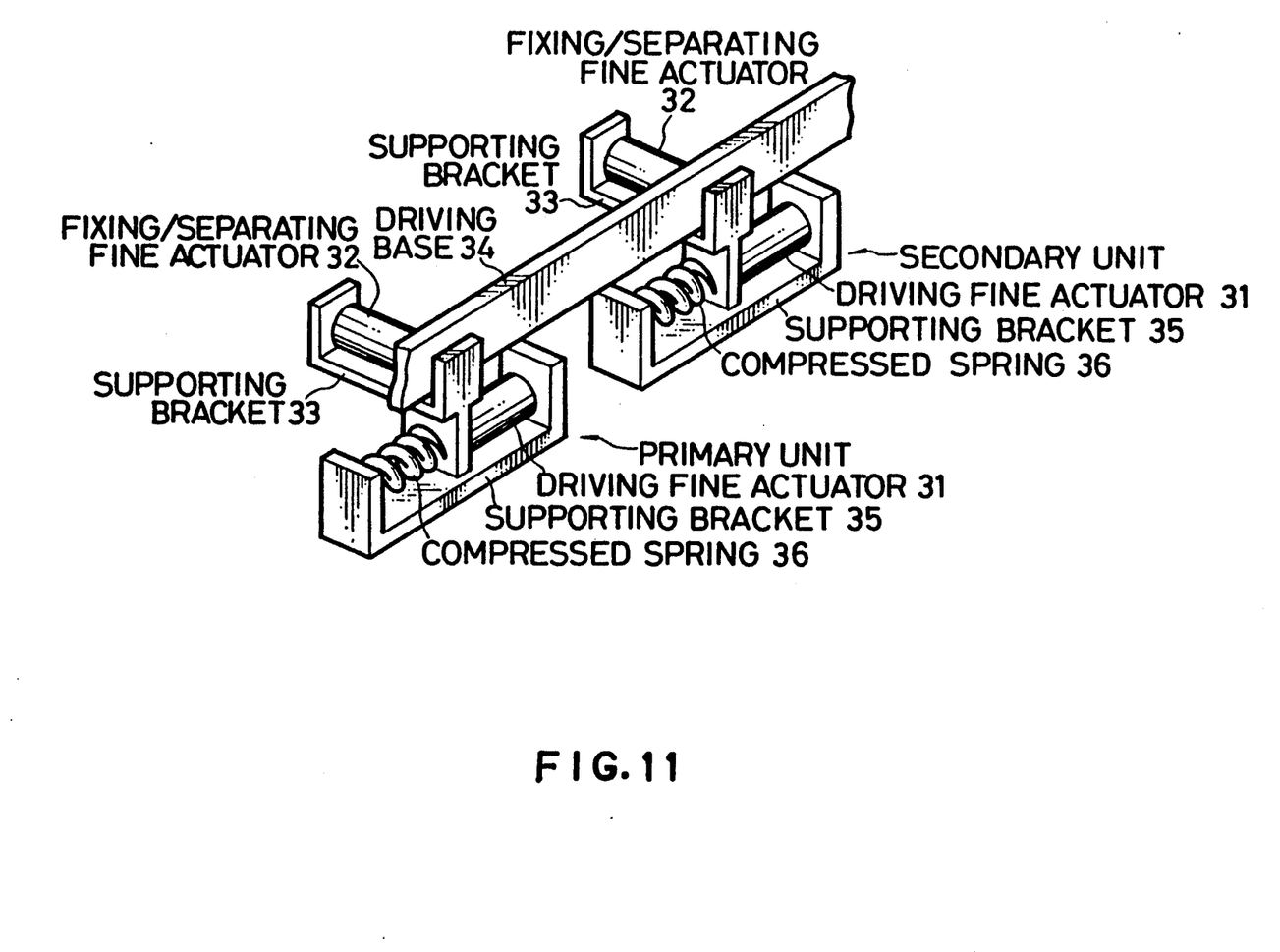
FIG. 11 is a perspective view of an another linear actuator of this invention.

FIG. 11 is a summarized perspective view of the another example of the linear actuator of this invention. Two linear actuators (the primary unit and the secondary unit) shown in FIG. 6 are mounted forming a line.

Figure 12:
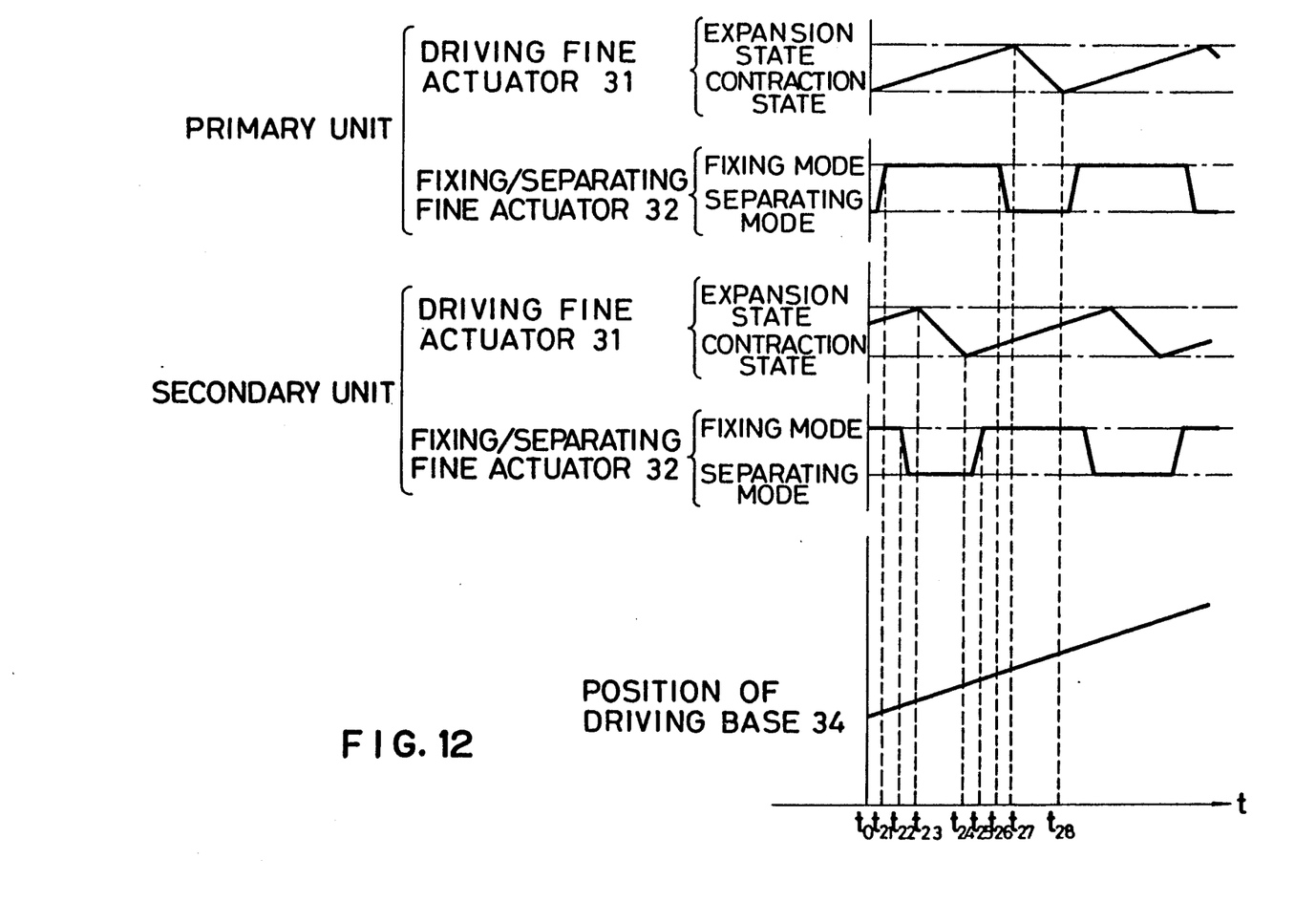
FIG. 12 is a time chart of the operating example of the linear actuator.

The operating sequence of this linear actuator is shown by the time chart shown in FIG. 12, and will be explained as follows.

(1) Time $t_0$-Time $t_{21}$

Since the driving base 34 and the supporting bracket 33 of the secondary unit are fixed by the fixing/separating fine actuator 32 of the secondary unit, the driving base 34 is driven by the expanding operation of the driving fine actuator 31 of the secondary unit. In this period, the driving fine actuator 31 of the primary unit operates from the contration state to the expansion state, and the fixing/separating fine actuator 32 of the primary unit operates from the separating mode to the fixing mode at the time that the deflection of the moving velocity of the driving base 34 and the moving velocity of the driving fine actuator 31 of the primary unit, i.e., the moving velocity of the supporting bracket 33, becomes less than or equal to the specified allowable value. The fixing/separating fine actuator 32 of the primary unit is in the fixing mode.

(2) Time $t_{21}$ -Time $t_{22}$

Since the driving base 34 and the supporting bracket 33 of the primary unit are fixed by the fixing/separating fine actuator 32 of the each unit, the driving base 34 is driven by the expanding operation of the driving fine actuator 31 of each unit.

(3) Time $t_{22}$ -Time $t_{23}$

Since the driving base 34 and the supporting bracket 33 of the primary unit are fixed by the fixing/separating fine actuator 32 of the primary unit, the driving base 34 is driven by the expanding operation of the driving fine actuator 31 of the primary unit. In this period, the driving fine actuator 31 of the secondary unit operates from the contraction state to the expanstion state, and the fixing/separating fine actuator 32 of the secondary unit operates from the fixing mode to the separating mode. Therefore, the driving force of the driving fine actuator 31 of the secondary unit is not transferred to the driving base 34 at the time that the fixing/separating fine actuator 32 of the secondary unit is in the separating mode.

(4) Time $t_{23}$ -Time $t_{24}$

Since the driving base 34 and the supporting bracket 33 of the primary unit are fixed by the fixing/separating fine actuator 32 of the primary unit, the driving base 34 is driven by the expanding operation of the driving fine actuator 31 of the primary unit. In this period, the supporting bracket 33 and the fixing/separating fine actuator 32 of the secondary unit move to the direction opposite to the moving direction of the driving base 34 by the operation of the driving fine actuator 31 of the secondary unit from the expansion state to the contraction state.

(5) Time $t_{24}$ -Time $t_{25}$

Since the driving base 34 and the supporting bracket 33 of the primary unit are fixed by the fixing/separating fine actuator 32 of the primary unit, the driving base 34 is driven by the expanding operation of the driving fine actuator 31 of the primary unit. In this period, the driving fine actuator 31 of the secondary unit operates from the contraction state to the expansion state, and the fixing/separating fine actuator 32 of the secondary unit operates from the separating mode to the fixing mode at the time that the deflection of the moving velocity of the driving base 34 and the moving velocity of the driving fine actuator 31 of the secondary unit, i.e., the moving velocity of the supporting bracket 33, becomes less than or equal to the specified allowable value. The fixing/separating fine actuator 32 of the secondary unit is in the fixing mode.

(6) Time $t_{25}$ -Time $t_{26}$

Since the driving base 34, the supporting bracket 33 of the primary unit and the supporting bracket 33 of the secondary unit are fixed by the fixing/separating fine actuator 32 of each unit, the driving base 34 is driven by the expanding operation of the driving fine actuator 31 of each unit.

(7) Time $t_{26}$ -Time $t_{27}$

Since the driving base 34 and the supporting bracket 33 of the secondary unit are fixed by the fixing/separating fine actuator 32 of the secondary unit, the driving base 34 is driven by the expanding operation of the driving fine actuator 31 of the secondary unit. In this period, the driving fine actuator 31 of the primary unit operates from the contraction state to the expansion state, and the fixing/separating fine actuator 32 of the primary unit operates from the fixing mode to the separating mode. Therefore, the driving force of the driving fine actuator 31 of the primary unit is not transferred to the driving base 34 at the time that the fixing/separating fine actuator 32 of the primary unit is in the separating mode.

(8) Time $t_{27}$ -Time $t_{28}$

Since the driving base 34 and the supporting bracket 33 of the secondary unit are fixed by the fixing/separating fine actuator 32 of the secondary unit, the driving base 34 is driven by the expanding operation of the driving fine actuator 31 of the secondary unit. In this period, the supporting bracket 33 and the fixing/separating fine actuator 32 of the primary unit are moved in the direction opposite to the moving direction of the driving base 34 by the operation of the driving fine actuator 31 of the primary unit from the expansion state to the contraction state.

The above described sequence is one cycle of the operation of another example of the linear actuator of the present invention. The driving base 34 can be thus precisely controlled so as to move a specific distance at a specific velocity without stopping and depending on the inertial force by the continuous repetition of (1) to (8). In addition, the moving direction of the driving base 34 can be changed to the opposite direction by the alteration of the operating velocity of the driving fine actuator 31 and the operation timing of the driving fine actuator 31 and the fixing/operating fine actuator 32. Furthermore, the maximum speed can be increased by the accumulation of a plurality of fine actuators operating in the same direction, i.e., operating the supporting bracket supporting the driving fine actuator driving the driving base by another driving fine actuator. Finally, the driving force can be increased by the driving of a plurality of lined-up driving fine actuators.

In the linear actuator of this invention utilizing the fine actuator consisting of a commercially available piezoelectric element (diameter, 22 mm; length, 58 mm; displacement, 50 $\mu$m; response time, 100 $\mu$sec; generating force, max 400 kgf), a resolution of less than or equal to 0.1 $\mu$m can be obtained under the conditions of a max speed of 30 m/min and a driving power of 400 kgf (one-way operation).

Since the linear actuator of this invention can obtain an operation with high driving force, high-speed, high-accuracy and the capability of high acceleration and deceleration in spite of its compactness as above described, when this linear actuator is used, for example, in machine tools, it can be miniaturized, and can be highly accuracy and can be economical.

It should be understood that many modifications and adaptations of the invention will become apparent to those skilled in the art and it is intended to encompass such obvious modifications and changes in the scope of the claims appended hereto.

What is claimed is;

1. A linear actuator comprising:
   a primary fine means for fixing and separating a driving base from a support bracket used for supporting said primary fine means;
   a secondary fine means for fine driving said primary means and
   a controlling means for controlling the movements of said primary fine means and secondary fine means;
   wherein the fixing of said driving base by said primary fine means is performed when a difference between a moving velocity of said driving base in a driven direction and a moving velocity of said primary fine means driven by said secondary fine means in said driven direction becomes less than or equal to a specified allowable value, and the driving of said primary fine means driven by said secondary fine means in the direction opposite to that of said driven direction in the absence of the transfer of the driving force of said secondary fine means to said driving base is performed when said driving base is separated from said primary fine means.

2. A linear actuator according to claim 1, wherein said driving base is spatially fixed and said primary and secondary fine means move with respect thereto.

3. A linear actuator according to claim 1, wherein the moving velocity of said fine means is controlled by said controlling means.

4. A linear actuator according to claim 2, wherein the moving velocity of said fine means is controlled by said controlling means.

5. A linear actuator comprising a plurality linear actuator elements disposed in a common driven direction, each of said linear actuator elements comprising:
   a primary fine means for fixing and separating a driving base from a support bracket used for supporting said primary fine means;
   a secondary fine means for fine driving said primary means and
   a controlling means for controlling the movement of said primary fine means and secondary fine means;
   wherein the fixing of said driving base by said primary fine means is performed when a difference between a moving velocity of said driving base in a driven direction and a moving velocity of said primary fine means driven by said secondary fine means in said driven direction becomes less than or equal to a specified allowable value, and the driving of said primary fine means driven by said secondary fine means in the direction opposite to that of said driven direction in the absence of the transfer of the driving force of said secondary fine means to said driving base is performed when said driving base is separated from said primary fine means.

6. A linear actuator according to claim 5, wherein said driving base of each of said linear actuator elements is spatially fixed and said primary and secondary fine means thereof move with respect thereto.

7. A linear actuator according to claim 5, wherein at least one of said linear actuator elements drive a driving base.

8. A linear actuator according to claim 6, wherein at least one of said linear actuator elements drive a driving base.

* * * * *